United States Patent
Giuliani

[11] 3,778,635
[45] Dec. 11, 1973

[54] LIQUID PARAMETRIC OPTICAL MIXING DEVICE

[75] Inventor: John F. Giuliani, Kensington, Md.

[73] Assignee: The United States of America as represented by the Secretary of the Navy, Washington, D.C.

[22] Filed: June 8, 1972

[21] Appl. No.: 260,863

[52] U.S. Cl................................. 307/88.3, 250/199
[51] Int. Cl............................................... H03f 7/00
[58] Field of Search.................................... 307/88.3

[56] References Cited
UNITED STATES PATENTS
| | | | |
|---|---|---|---|
| 3,600,600 | 8/1971 | Bey et al............................. | 307/88.3 |
| 3,390,278 | 6/1968 | Giordmaine et al............... | 307/88.3 |
| 3,364,433 | 1/1968 | Freund et al............................ | 330/5 |

OTHER PUBLICATIONS
Kaminow, "IEEE Spectrum," April 1965, pp. 35-43

*Primary Examiner*—Herman Karl Saalbach
*Assistant Examiner*—Darwin R. Hostetter
*Attorney*—R. S. Sciascia et al.

[57] ABSTRACT

A laser-light mixing device in which the nonlinear medium for mixing two collinear laser beams comprises the chemical compound hexafluoroisopropanol, $(CF_3)_2CHOH$, which has an index of refraction which varies by only one part per thousand over a spectral range of 6,300 to 7,700 A, thus enabling mixing to occur over a long pathlength. The light resulting from the mixing action is then passed through an optical filter which allows only the sum or difference frequency to pass.

8 Claims, 2 Drawing Figures

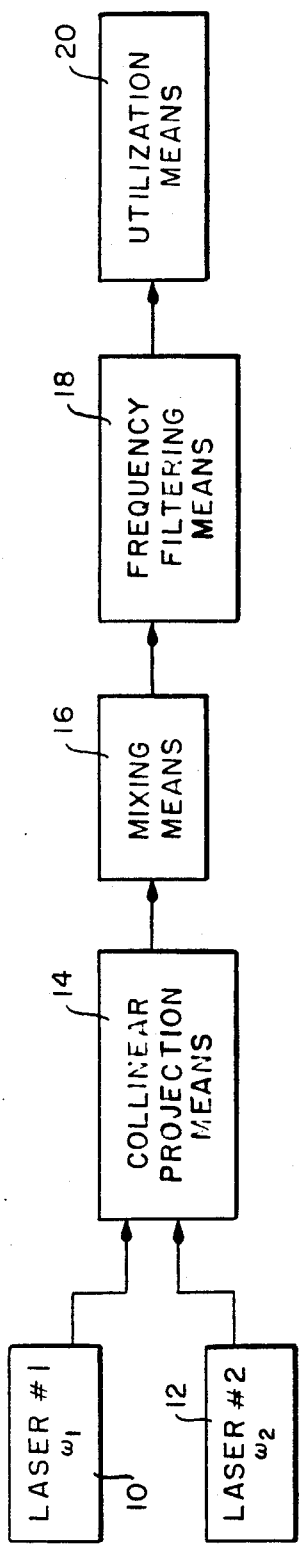
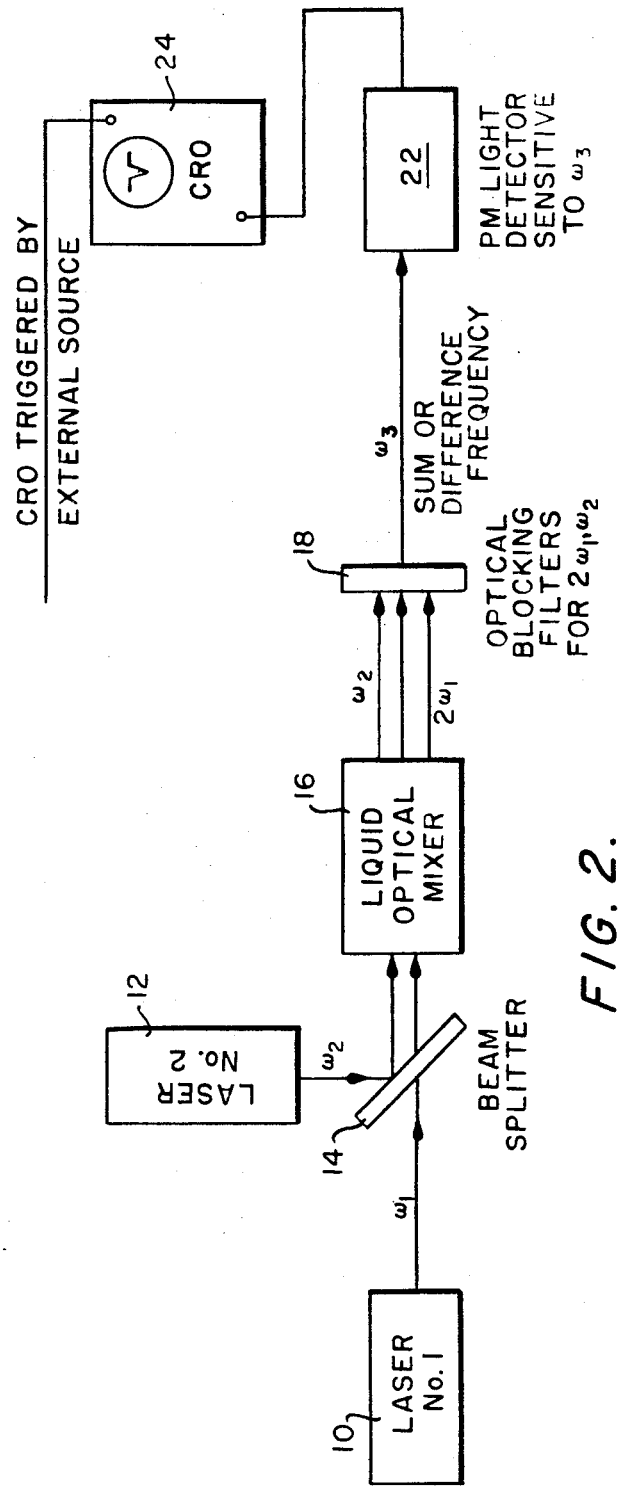

LIQUID PARAMETRIC OPTICAL MIXING DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to frequency shifting of laser light by the mixing of laser beams in a nonlinear medium and especially to such mixing in a medium of hexafluoroisopropanol.

Many nonlinear materials are employed in the frequency shifting of laser beams. They can be generally divided into two major classes:

a. Acentric crystals which because of their large nonlinear susceptibility and optical birefringence can be used to shift optical waves over very broad optical regions.

b. Raman active liquids which are used to discretely shift light frequencies due to their ability to strongly emit light radiation at a characteristic Raman vibrational transition under laser excitation.

Although materials of class (a) are useful because of their large nonlinear coefficient, they suffer from a number of practical disadvantages: (1) they are costly to fabricate and polish, (2) they are angular-dependent for phase-matching, (3) up to the present time, only small volume crystals of very high optical transparency and homogeneity are possible, and (4) most crystals are readily susceptible to surface and/or bulk damage from high energy laser sources.

As for materials of type (b), their principal drawback is the fact that more than one Raman-active material is required to produce a comparable range of coherent radiation.

BRIEF SUMMARY OF THE INVENTION

The advantages of the invention are obtained by utilizing, as a medium for mixing the light from at least two lasers, a single-compound liquid which has a substantially flat, or constant, index of refraction over a given range of frequencies, the laser beam frequencies lying in this spectral range. The flat index of refraction provides phase-matching for the laser beams thus allowing them to be projected collinearly through a long length of the liquid mixing medium and to have beam interaction over this long length of path. This long interval of beam interaction provides high mixing efficiency.

A particular liquid compound which can be used is hexafluoroisopranol, the dispersive index of which is flat to one part in 1,000 over the spectral range of 6,300 to 7,700 A.

An object of the invention is to mix two laser-light beams in a broadband, parametric optical mixing device.

Another object is to produce a broad range of overlapping optical frequencies over the visible spectrum from laser-light sources lying in the 6,300–7,700 A range.

A further object is to efficiently utilize a long liquid-mixer pathlength to obtain a significant build-up of intensity at the sum and difference frequencies produced in optical mixing via the weak third-order nonlinear interaction.

Yet another object is to provide a low-cost optical mixer for laser light which will withstand very large laser intensities without damage.

Other objects, advantages and novel features of the invention will become apparent from the following detailed description of the invention when considered in conjunction with the accompanying drawing wherein:

BRIEF DESCRIPTION OF THE DRAWING

FIG. 1 is a generalized block diagram of an optical mixer embodying the invention;

FIG. 2 is a block diagram of an optical mixer in more detail.

DETAILED DESCRIPTION

In FIG. 1, two laser-light sources 10 and 12 having frequencies of $\omega_1$ and $\omega_2$, respectively, project their beams on a beamsplitter 14 which passes part of the first beam and reflects part of the second beam so that they are passed collinearly through the mixing means 16. For practical purposes, one of the lasers should be a high-power laser; otherwise, the mixing results in an unuseably low-energy output.

The mixing means 16 is the heart of the device and comprises a liquid fluoroalcohol in a transparent container. The liquid is hexafluoroisopropanol $(CF_3)_2CHOH$, a material which is highly transparent over the visible near-infrared spectral region and possesses an index of refraction (or dispersive index), $n$, that is constant to one part in $10^3$ between 6,300 and 7,700 A. Thus any laser sources whose light lies in this range can be employed with this device.

Sum and difference frequencies are produced by mixing within the liquid, some of the new frequencies being $\omega_3 = 2\omega_1 \pm \omega_2$. (Note: the numeral "2" in the factor "$2\omega_1$" does not mean that the frequency "$\omega_1$" is doubled; it refers to the fact that the equation refers to a four-photon process, there being one photon of frequency $\omega_3$, one photon of frequency $\omega_2$ and two photons of frequency $\omega_1$.). $\omega_1$ of course, is equal to $2\pi c/\lambda$ where $c$ is the velocity of light and $\lambda$ is the wavelength of the laser beam. The momentum relation is $2k_1 \pm k_2 - K_3 = 0$, where $k = 2\pi n/\lambda$, $n$ being the index of refraction. These equations are satisfied in this device for $\omega$'s which lie between 15,873 to 12,987 cm$^{-1}$ in which the refractive index does not change, i.e., $n_1 = n_2 = n_3$. Optical filter means 18 comprising blocking filters are used to block out the undesired frequencies, allowing $\omega_3$ (either the sum or the difference frequency) to pass.

The output of the filtering means 18 is then coupled to some utilization means 20 which may, for example, include a PM (photomultiplier) light detector 22 which is sensitive to $\omega_3$ and a cathode-ray oscilloscope 24 to display the signal from the light detector 22.

The unique feature of the mixing liquid, $(CF_3)_2CHOH$, in that it possesses an index of refraction that is constant to one part in $10^3$ over the range of 6,300 to 7,700 A, allows for phase-matching over a broad range of laser frequencies over this spectral region to produce new light waves by means of the sum or difference frequency generated between the interacting laser beams. Thus, this single liquid can produce a wide selection of coherent optical radiation over this spectral region.

The mixing device is inexpensive, has good optical transparency and homogeneity over the visible near-infrared region, lacks angular dependence of the liquid with respect to the external light beams being mixed and the liquid can withstand very large laser intensities without thermal damage.

The principal advantage of the present device over type (b) materials is its ability to easily produce a broad range of overlapping optical frequencies over the visible spectrum which would otherwise require a large number of Raman-active materials to overlap the same region.

One of the most important features of the device is the efficient utilization of very long liquid pathlengths, which results in a significant build-up of light intensity at the sum and difference frequencies produced in the optical mixing via the weak third order nonlinear interaction. It is estimated that the coherence length achieved in the mixing material is at least 100 times larger than any reported to date for optical mixing in liquid media over this spectral range.

This device could be easily incorporated into dye-laser systems to extend their emission lines through mixing over a significantly broader spectral range. Thus, one dye laser which emits principally over the red wavelength region could, through mixing in this device, produce additional laser lines extending into the near-IR spectral region. As a result, one simple system would replace the need for using separate lasing dyes with which to generate light waves over the same spectral region.

This device can also serve as an efficient nonlinear medium for the measurement of the time duration of ultra-short laser pulses through the mixing of laser beams via the third order intensity correlation function. For example, a mode-locked ruby laser at one frequency is used to generate a second frequency, i.e., from a Raman liquid and the ultra-short pulses from both sources are combined in this device to produce, for example, the sum frequency. By varying the time delay of one set of pulses from the ruby source with respect to the pulses generated from the Raman laser source, one could map out the shape of the original mode-locked ruby laser pulse. Although this application is not new, the use of this unique device would provide a significant improvement in the signal-to-background discrimination over other materials employed in this application. The higher signal-to-noise enhancement would result in the attainment of finer detail for the original ultra-short pulse shape.

Obviously many modifications and variations of the present invention are possible in light of the above teachings. It is therefore to be understood that within the scope of the appended claims the invention may be practiced otherwise than as specifically described.

What Is Claimed And Desired To Be Secured By Letters Patent Of The United States Is:

1. In a mixing device for mixing the light output from at least two laser-light sources, said mixing device comprising at least two sources of laser light having frequencies lying in a given spectral range, collinear projection means for projecting the output beams of said laser sources collinearly, mixing means for nonlinearly combining said two laser beams, and frequency filtering means for blocking all light from said mixing means except a sum or a difference frequency of said two laser beams, a liquid mixing medium for use in said mixing means comprising a single-compound liquid whose index of refraction is substantially flat over said given range of spectral frequencies, said index of refraction changing by no more than one part in one thousand over said spectral range, said liquid medium being capable of containing other additives as desired where such additives do not lessen the flatness of the overall index of refraction of the medium below one part in one thousand.

2. Apparatus as in claim 1, said compound having a substantially flat index of refraction from approximately 6,300 to approximately 7,700 A.

3. Apparatus as in claim 1, said compound being hexafluoroisopropanol, $(CF_3)_2CHOH$.

4. Apparatus as in claim 3, wherein said collinear projection means comprises a beamsplitter and said filtering means comprises optical blocking filters.

5. In a mixing device for mixing the light output from at least two laser-light sources, said mixing device comprising at least two sources of laser light having frequencies lying in a given spectral range, collinear projection means for projecting the output beams of said laser sources collinearly, mixing means for nonlinearly combining said two laser beams, and frequency filtering means for blocking all light from said mixing means except a sum or a difference frequency of said two laser beams, a liquid mixing medium for use in said mixing means consisting of a single-compound liquid whose index of refraction is substantially flat over said given range of spectral frequencies said index of refraction changing by no more than one part in 1,000 over said spectral range, said liquid medium being capable of containing other additives as desired where such additives do not lessen the flatness of the overall index of refraction of the medium below one part in one thousand.

6. Apparatus as in claim 5, said compound having a substantially flat index of refraction from approximately 6,300 to approximately 7,700 A.

7. Apparatus as in claim 5, said compound being hexafluoroisopropanol, $(CF_3)_2CHOH$.

8. Apparatus as in claim 7, wherein said collinear projection means comprises a beamsplitter and said filtering means comprises optical blocking filters.

* * * * *